May 18, 1965  H. R. WALDEN  3,183,619
FISHING EQUIPMENT
Filed Dec. 19, 1962
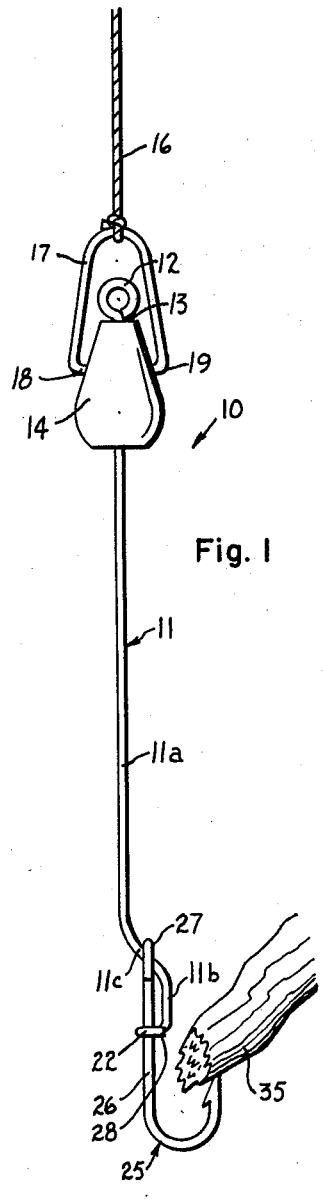
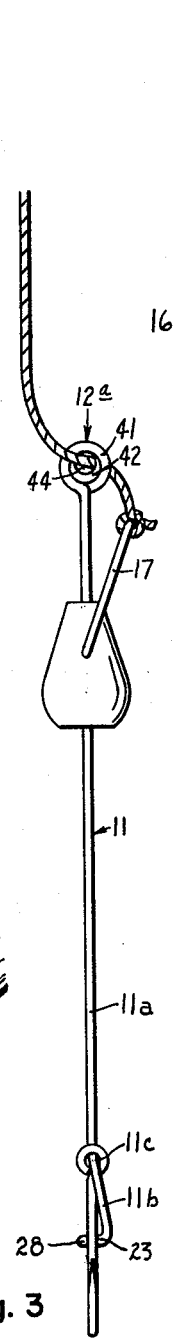
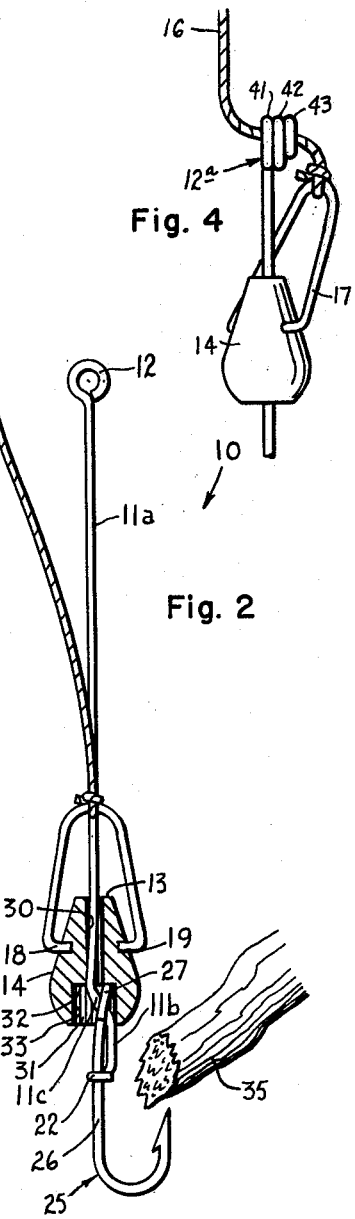
Fig. 1
Fig. 2
Fig. 3
Fig. 4
Harry R. Walden
INVENTOR.
BY

3,183,619
FISHING EQUIPMENT
Harry R. Walden, 215 Henry St., Dallas, Tex.
Filed Dec. 19, 1962, Ser. No. 245,898
6 Claims. (Cl. 43—17.2)

This invention relates to fishing equipment and more particularly to a fish hook retriever for freeing snagged hooks from bush and the like.

An object of this invention is to provide a new and improved fish hook retriever for retrieving a fish hook lowered on a line into water and snagged on brush or other submerged object which is operable by manipulation of the line to which the hook is connected by the retriever.

Another object is to provide a fish hook retriever having a mass for imparting downward blows to a snagged hook by manipulation of the line to which the hook is secured by the retriever in order to free the hook from the object on which it is snagged.

Still another object is to provide a fish hook retriever which is connectable between the line and the hook and includes an elongate slide member on which a mass is mounted for longitudinal movement whereby the weight may be raised by the line and then allowed to drop to impart a downwardly acting blow to the hook to cause its disengagement from the object on which it is snagged.

A further object is to provide a fish hook retriever wherein the slide member is provided with means at its lower end for releasably mounting the fish hook thereon and having a mass slidably mounted thereon for limited longitudinal movement thereon, the weight being connectable to a fishing line.

A still further object is to provide a new and improved fish hook retriever which is of simple economical construction and which is easily operable by movement of the fishing line for freezing the hook carried thereby.

Additional objects and advantages of the invention will be readily apparent from the reading of the following description of a device constructed in accordance with the invention, and reference to the accompanying drawings thereof, wherein:

FIGURE 1 is a side view of the fish hook retriever embodying the invention showing it connected to the lower end of the fishing line and showing the hook carried thereby snagged on a piece of brush;

FIGURE 2 is a view similar to FIGURE 1, partly in section, showing the manner in which the mass is lowerable on the slide member to impart a downwardly directed blow to the upper end of the hook to free the hook from the brush;

FIGURE 3 is a front view of a modified and preferred form of the fish hook retriever; and, FIGURE 4 is a fragmentary side view of the fish hook retriever of FIGURE 3.

Referring now to the drawings, the fish hook retriever 10 includes an elongate slide member or wire 11 whose upper end is enlarged as by bending the upper end to form an eye 12. The eye 12 engages the upper end surface 13 of a lead mass or weight 14 slidably mounted on the upper straight portion 11a of the slide member to limit upward movement of the mass relative to the slide member. The mass is secured to the lower end of the fishing line 16 by a bail 17 whose free end portions 18 and 19 extend into suitable transverse outwardly and oppositely opening bores of the mass 14. The lower end of the fishing line 16 is tied to the bight portion of the bail. The bail is pivotally movable about the axis of the inwardly extending free end portions 18 and 19 of the bail so that the bail may pivot to avoid interference with the slide member which might prevent the downward movement of the mass 14 on the slide member. The slide member 11 has an offset lower section 11b which is connected to the lower end of the long portion 11a by an angularly extending connection portion 11c. The offset portion 11b is provided with an arcuate hook portion 22 disposed in a plane perpendicular to the longitudinal axis of the long portion 11a and the offset portion 11b. The hook portion 22 has an open throat 23 as clearly seen in FIGURE 3.

The slide member 11 which is adapted to be vertically disposed as shown, is preferably formed of a relatively stiff but resilient substance, such as spring wire, so that a hook 25 having a usual straight shank 26 provided with an eye 27 on its upper end may be easily connected or mounted on the lower end of the slide member by inserting the free end 28 of the hook portion 22 into the eye 27 of the hook, then moving the eye upwardly on the slide wire until it is located on the angularly extending portion 11c thereof and then resiliently flexing the lower portions of the slide member to cause the shank 26 to move through the open throat 23 of the hook portion 22 to the position illustrated in the drawing. The hook of course can be easily disconnected from the lower end of the slide member by resiliently bending the lower portions of the slide member to move the sank 26 thereof out of engagement with the hook portion 22 of the slide member and then simply sliding the eye 27 of the hook downwardly off the hook end portion 22 of the retriever. The angularly extending or stop portion 11c of the wire limits downward movement of the mass 14 on the slide wire. The mass is provided with a longitudinal bore or passage 30 enlarged at the lower end to provide a recess 31 defined by an annular downwardly facing shoulder 32 and an annular substantially vertical side surface 33. The eye 27 of the hook is receivable in the recess 31 when the mass moves to its lowermost position on the slide member, the annular shoulder 32 then engaging the eye 27 at the upper end of the hook and the annular vertical surface 33 being engageable with the eye to prevent movement of the upper end of the hook on the slide member and thus to prevent its displacement on the slide member due to the blows imparted to the eye by the mass.

In use, the fishing line 16 is tied to the bight portion of the bail 17, the fish hook 25 is mounted on the lower end of the slide member 11 and is rigidly and releasably held thereon. The hook may be baited in any suitable manner and the retriever and baited hook lowered into the water. If desired, the fishing line 16 may be provided with the usual float, not shown, which will bobble on the surface of the water when the fish takes the bait.

Should the hook now be snagged on any object, such as for example, the branch 35 of brush or some other underwater obstacle, either due to the movement of the fishing line or due to the carrying of the hook by a fish, the line is lifted by the fisherman to take up the slack therein. The line is then released to permit the mass 14 to slide on the wire and impart a downwardly directed blow to the upper end of the hook due to the engagement of the shoulder 32 of the mass with the eye of the hook. One or more of such downward blows will disengage the hook from the branch 35 and thus permit its removal. It will be apparent that the mass 14 functions as a sinker to pull the line 16 down into the water and that it is also useable as the means operable from above the surface of the water for freeing a snagged hook from brush and the like.

Since the lower portion of the weight or mass 14 actually engages the eye portion of the hook and the hook is held in alignment with the slide portion of the bail, the force of the blow imparted to the hook is directed axially along the shank of the hook and clearly tends to disengage the point of the hook from the brush or other material in which it may be snagged, and the force of the blow imparted by the mass more effectively acts to release the hook from its snagged condition.

In the preferred form of the fish hook retriever illustrated in FIGURES 3 and 4, the eye 12a on the upper end of the slide portion 11a of the slide member 11, is in the form of three coils 41, 42 and 43 which extend in a direction opposite from the hook 25 and form a guide opening 44 extending perpendicularly from the slide member through which the line 16 extends so that the bail 17 will be positioned on the side of the slide member opposite the hook and the fishing line will be held spaced from the slide portion 11a of the slide member. The transverse guide or eye 12a thus prevents fouling of the line on the slide member and ensures that the bail of the slide member will not fall on or engage over the hook since the bail is held on the side of the slide portion 11a opposite the hook.

It will further be seen that while a fish hook retriever has been described as being connected to the fishing line provided with a float that fish hook retrievers embodying the invention may be used to secure hooks to trotlines and the like.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A fish hook retriever including: a stiff resilient elongate slide member adapted to be vertically disposed; a mass slidably mounted on said slide member, said slide member having means at its upper end for limiting upward movement of said mass on said slide member; means on the lower end of said slide member for releasably securing a fish hook thereto; means carried by said mass for securing said mass to a flexible line, said mass being reciprocably slidable on said slide member by means of said line; downward movement of said mass being stopped by engagement thereof with the upper end of a hook secured to the lower end of said slide member whereby repeated downward blows may be imparted to said hook by reciprocation of said mass on said slide member by means of said flexible line.

2. A fish hook retriever including: a mass; a slide member, said slide member having an upper slide portion on which said mass is slidable, a portion of said slide member extending in a direction parallel to the longitudinal axis of said upper slide portion and offset therefrom, an angularly extending connector portion connecting the upper end of said offset portion to the lower end of said upper slide portion and a hook portion extending from the lower end of said offset portion in a plane perpendicular to said axis whereby a hook having a shank with an eye at its upper end may be secured to said slide member with its eye disposed about said angularly extending connector portion and its shank disposed in said hook portion, said slide member having means at its upper end for limiting upward movement of said mass on said slide member; means for securing a fishing line to said mass whereby downward movement of said mass on said upper slide portion is stopped by engagement thereof with the upper end of a hook secured to said slide member by means of said connector portion and said hook portion.

3. A fish hook retriever including: a slide member; a mass slidably mounted on said slide member, said slide member having means at its upper end for limiting upward movement of said mass on said slide member; means for securing a fishing line to said mass; said slide member having an upper slide portion on which said mass is slidable, a portion of said slide member extending in a direction parallel to the longitudinal axis of said upper slide portion and offset therefrom, an angularly extending connector portion connecting the upper end of said offset portion to the lower end of said upper slide portion; and a hook portion extending from the lower end of said offset portion in a plane perpendicular to said axis; and a fish hook having a shank provided at its upper end with an eye, said connector portion extending through said eye and said shank of said hook being disposed in said hook portion of said slide member, whereby downward movement of said mass or said upper slide portion is stopped by engagement thereof with the upper end of the hook.

4. A fish hook retriever including: a slide member; a mass slidably mounted on said slide member, said slide member having means at its upper end for limiting upward movement of said mass on said slide member; means for securing a fishing line to said mass, said slide member having an upper slide portion on which said mass is slidable, a portion of said slide member extending in a direction parallel to the longitudinal axis of said upper slide portion and offset therefrom, an angularly extending connector portion connecting the upper end of said offset portion to the lower end of said upper slide portion; and a hook portion extending from the lower end of said offset portion in a plane perpendicular to said axis whereby a fish hook having a shank with an eye at its upper end may be secured to said slide member with its upper eye disposed about said angularly extending connector portion and its shank disposed in said hook portion whereby downward movement of said mass is stopped by engagement thereof with the upper end of a hook secured to said slide member, said mass having a downwardly opening recess at its lower end providing an annular downwardly facing stop shoulder and a vertically extending annular surface, the eye of the hook being receivable in said recess whereby lateral movement of the eye of the hook on the connector portion is limited by said annular surface when the mass is in its lowermost position on said slide member.

5. A fish hook retriever including: a slide member; a mass slidably mounted on said slide member, said slide member having means at its upper end for limiting upward movement of said mass on said slide member; means for securing a fishing line to said mass, said slide member having an upper slide portion on which said mass is slidable, a portion of said slide member extending in a direction parallel to the longitudinal axis of said upper slide portion and offset therefrom, an angularly extending connector portion connecting the upper end of said offset portion to the lower end of said upper slide portion; and an open curved hook portion extending from the lower end of said offset portion in a plane perpendicular to said axis; and a fish hook having a shank provided at its upper end with an eye, said connector portion extending through said eye and said shank of said hook being disposed in said hook portion of said slide member whereby downward movement of said mass on said upper slide portion is stopped by engagement thereof with the upper end of a hook secured to said slide member, said means having a downwardly opening recess at its lower end providing an annular downwardly facing stop shoulder and a vertically extending annular surface, the eye of the hook being receivable in said recess when said mass is in its lowermost position on said slide member whereby lateral movement of the eye of the hook on the connector portion is limited by said annular surface.

6. The fish hook retriever of claim 1 wherein said means at the upper end of said slide member includes means providing a guide opening extending perpendicularly from said slide member in a direction opposite to that of a hook secured to the lower end of the slide member whereby said flexible line may extend slidably through said guide member.

References Cited by the Examiner
UNITED STATES PATENTS

| | | | |
|---|---|---|---|
| 617,236 | 1/99 | Dougherty | 43—17.2 X |
| 720,136 | 2/03 | Halliran | 43—17.2 |
| 2,609,633 | 9/52 | Cracker | 43—42.05 |
| 2,732,648 | 1/56 | Bryn | 43—42.72 X |

ABRAHAM G. STONE, *Primary Examiner.*

JOSEPH S. REICH, *Examiner.*